(12) United States Patent
Sasaki

(10) Patent No.: US 7,630,164 B2
(45) Date of Patent: Dec. 8, 2009

(54) LIBRARY APPARATUS, HAVING RADIO TAGS FOR ARRANGING PLURALITY OF TAPE DRIVES

(75) Inventor: Shinobu Sasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1117 days.

(21) Appl. No.: 10/999,975

(22) Filed: Dec. 1, 2004

(65) Prior Publication Data

US 2006/0039248 A1 Feb. 23, 2006

(30) Foreign Application Priority Data

Aug. 20, 2004 (JP) ............................. 2004-240426

(51) Int. Cl.
*G11B 15/68* (2006.01)
(52) U.S. Cl. .................... 360/92.1; 340/572.1
(58) Field of Classification Search .................. 360/92, 360/1, 91, 93, 94, 95, 81, 83, 85, 88
See application file for complete search history.

(56) References Cited

U.S. PATENT DOCUMENTS

| | | | | |
|---|---|---|---|---|
| 6,600,420 B2 * | 7/2003 | Goff et al. | ................. | 340/572.4 |
| 7,154,703 B2 * | 12/2006 | Kumpon et al. | .......... | 360/96.61 |
| 7,180,701 B2 * | 2/2007 | Armagost et al. | .......... | 360/96.4 |
| 7,227,715 B2 * | 6/2007 | Woodruff et al. | .......... | 360/96.4 |
| 7,265,938 B2 * | 9/2007 | Armagost et al. | .......... | 360/96.4 |
| 7,359,142 B2 * | 4/2008 | Heineman et al. | .......... | 360/92.1 |
| 7,400,469 B2 * | 7/2008 | Starr et al. | ................. | 360/92.1 |

FOREIGN PATENT DOCUMENTS

| | | |
|---|---|---|
| JP | 11-39755 | 2/1999 |
| JP | 2002-133751 | 5/2002 |
| JP | 2003-24269 | 1/2003 |
| JP | 2003-63625 | 3/2003 |
| JP | 2003-75565 | 3/2003 |

OTHER PUBLICATIONS

Japenese Patent Office Action mailed Dec. 11, 2007 for corresponding Japanese Patent Application No. 2004-240426.

* cited by examiner

*Primary Examiner*—Tan X Dinh
(74) *Attorney, Agent, or Firm*—Staas & Halsey

(57) ABSTRACT

Radio tags storing parts identifying information are arranged for the individual constituent modules such as tape drives and conveying robots of the library apparatus. Upon every rise of the apparatus, the conveying robots are moved to positions permitting read of the radio tags arranged on the individual constituent modules. The parts identifying information such as the serial number is read by the tag reader and stored in the non-volatile memory. When this is different from the serial number read in the preceding run, stored in the non-volatile memory, it is determined that the part has been replaced. The statistical information of the number of operating runs is then cleared, and management of the parts service life is started.

24 Claims, 11 Drawing Sheets

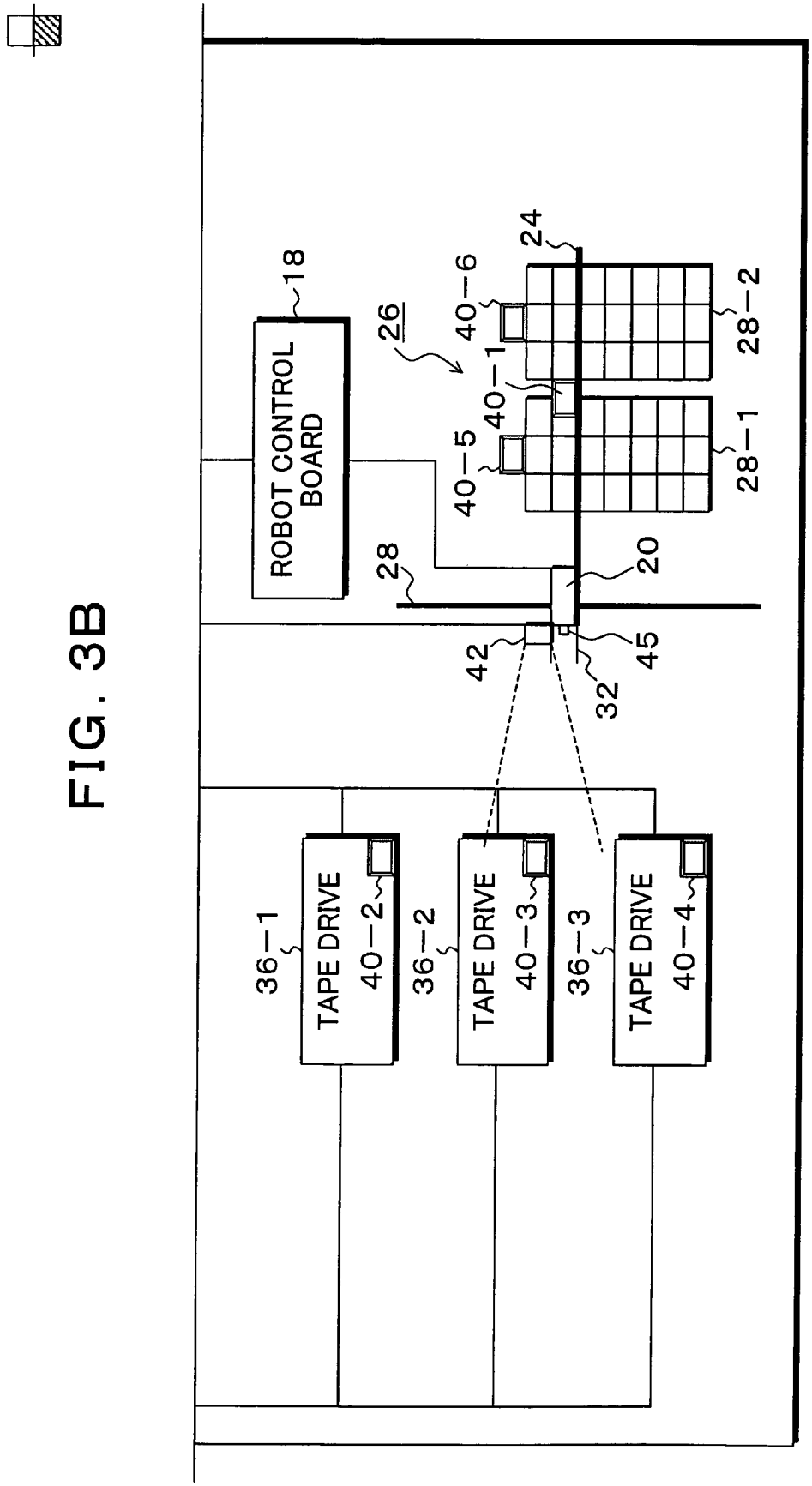

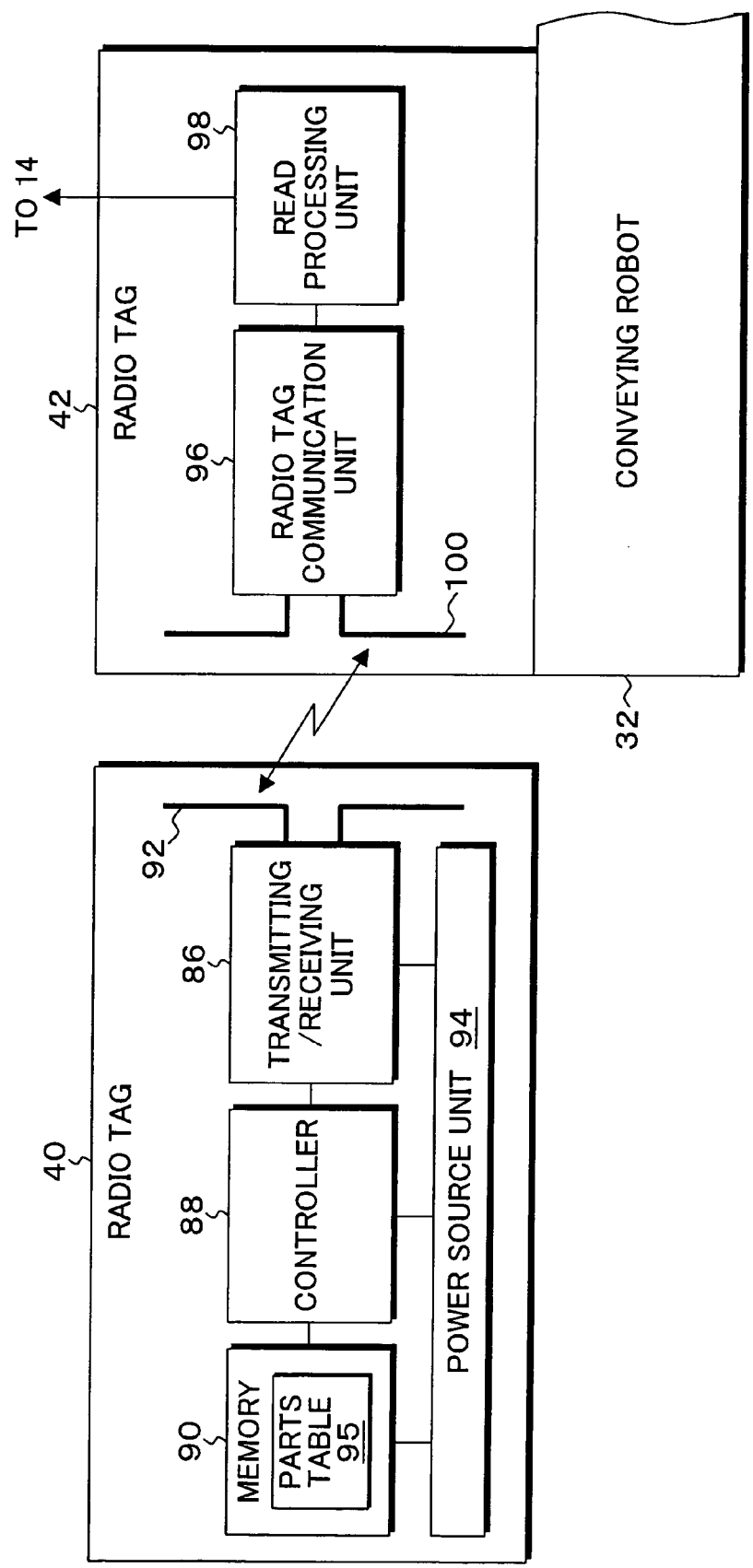

| PARTS NO. |
|---|
| PARTS VERSION NO. |
| PARTS SERIAL NO. |
| PARTS MANUFACTURING DATE |

FIG. 6

| MODULE NO. | MODULE NAME | POSITIONAL INFORMATION | INTRINSIC SETTING INFORMATION | MEASURED ALIGNMENT VALUE | IMPLEMENTATION FLAG |
|---|---|---|---|---|---|
| 1 | DRIVE | X1, Y1, Z1 | PORT ADDRESS A1 | ΔX1, ΔY1 | 1 |
| 2 | DRIVE | X2, Y2, Z2 | PORT ADDRESS A2 | ΔX2, ΔY2 | 1 |
| 3 | DRIVE | X3, Y3, Z3 | PORT ADDRESS A3 | ΔX3, ΔY3 | 1 |
| 4 | ROBOT | X4, Y4, Z4 | ------ | ------ | 1 |
| 5 | CELL UNIT | X5, Y5, Z5 | ------ | ------ | 1 |
| 6 | CELL MODULE | X6, Y6, Z6 | | | 1 |
| 7 | CELL MODULE | X7, Y7, Z7 | | | 1 |
| 8 | DRIVE | X8, Y8, Z8 | | | 0 |
| 9 | DRIVE | X9, Y9, Z9 | | | 0 |
| 10 | DRIVE | X10, Y10, Z10 | | | 0 |
| 11 | DRIVE | X11, Y11, Z11 | | | 0 |
| 12 | DRIVE | X12, Y12, Z12 | | | 0 |
| 13 | CELL MODULE | X13, Y13, Z13 | | | 0 |
| 14 | CELL MODULE | X14, Y14, Z14 | | | 0 |

70

ADDED

FIG. 7

| CELL ADDRESS | POSITIONAL INFORMATION |
|---|---|
| 001 | X1, Y1, Z1 |
| 002 | X2, Y2, Z2 |
| 003 | X3, Y3, Z3 |
| n-1 | Xn-1, Yn-1, Zn-1 |
| n | Xn, Yn, Zn |

| PARTS NO. | PARTS NAME | VERSION NO. | SERIAL NO. | MANUFACTURING DATE | NUMBER OF OPERATING RUNS | LIFE IN NUMBER OF RUNS |
|---|---|---|---|---|---|---|
| 1 | DRIVE | 1 | TD00001 | 2004/07/25 | 0001000 | 20000 |
| 2 | DRIVE | 1 | TD00002 | 2004/07/25 | 0001200 | 20000 |
| 3 | DRIVE | 1 | TD00003 | 2004/07/25 | 0001800 | 20000 |
| 4 | ROBOT | 1 | RB00000 | 2004/06/30 | 0003600 | 10000 |

LIBRARY APPARATUS, HAVING RADIO TAGS FOR ARRANGING PLURALITY OF TAPE DRIVES

This application is a priority based on prior application No. JP 2004-240426, filed Aug. 20, 2004, in Japan.

BACKGROUND OF THE INVENTION

1. Field of the Invention

The present invention relates to a library apparatus which performs recording or regeneration by taking out a cartridge tape housed in a cell on a cartridge housing shelf on the basis of a hose command by means of a conveying robot, conveying the same to a tape drive, and charging the same therein, a control method thereof, and a program therefore. In particular, it relates to a library apparatus which manages maintenance and replacement of constituent modules by the use of radio tags, a control method thereof and a program therefore.

2. Description of the Related Art

In a conventional library apparatus, a plurality of housing cells of a housing shelf provided in an enclosure keep medium cartridges such as magnetic tape cartridges in units of cells. The medium cartridge is picked up by a conveying robot from the housing cell designated as the destination on the basis of a conveying command from the host. The medium cartridge is conveyed to the drive module which is the destination designated by the conveying command and charged therein to perform recording or regeneration of the medium. For a medium cartridge after recording or regeneration, the medium cartridge is picked up by the conveying robot from the drive module designated as the destination on the basis of the conveying command from the host, and is conveyed and returned for housing the same at the destination designated in the conveying command.

In such a library apparatus, an operating unit such as a linear guide or a bearing and a driving unit such as a DC/AC servo motor, a gear motor, or a stepping motor are mounted on the conveying robot. The number of operating runs guaranteeing the operation is limited both for the operating unit and the driving unit. In the conventional library apparatus, therefore, operating conditions for the conveying robot and the tape drive are assumed for selecting operating parts and mechanism parts to generate a service life of a library apparatus. Depending upon the environment of use of the library apparatus, however, the assumed conditions of use are sometimes exceeded, and in some library apparatuses, the number of operating runs corresponding to the full service life may be exceeded before the lapse of years of life. In some cases, troubles may be caused before the lapse of years of life. In the conventional library apparatus, therefore, the life for parts replacement is managed relative to the number of operating runs representing the life, by accumulating statistical information such as the number of operating runs for the individual modules including the conveying robot and the tape drive.

However, in the life management method of the conventional library apparatus, when a mechanical unit or a driving unit in failure of a module is replaced, the maintenance operator manually clears the number of operating runs of the replaced module. The complicated procedure for maintenance and replacement often leads to omission in practice or negligence. This results in a problem in that the function of urging parts replacement in units of modules by automatically detecting approach of the lapse of the life by means of the number of runs managed by a library apparatus cannot fully display the practical advantages. When replacing a tape drive, it is necessary to re-adjust the alignment to ensure the conveying robot property handles the tape cartridge relative to the tape drive, and to conduct the maintenance operation of setting again the intrinsic setting information before replacement for the drive after replacement. If an error occurs in these maintenance operations, the drive cannot properly be connected to the host, or an incorrect alignment may lead to a failure of cartridge tape handling by the conveying robot.

SUMMARY OF THE INVENTION

According to the present invention, there are provided a library apparatus, a control method thereof, and a program therefore in which it is permitted to properly accomplish the life management of replacement parts and the setting processing required for replacement parts.

(Library Apparatus)

The present invention provides a library apparatus comprising, as constituent modules, a medium depot (cartridge housing shelf) keeping storage media in units of cells in a plurality of keeping cells; a plurality of recording/regenerating devices (tape drives) which record and regenerate information by the use of the storage media; medium conveyors (conveying robot) which convey storage media between the medium depot and the recording/regenerating devices; and a controller which enters the storage medium taken out from the medium depot into the recording/regenerating device under the control of the medium conveyor based on a command from a host to cause the recording/regenerating device to record or regenerate the same;

wherein the library apparatus has radio tags arranged for the individual constituent modules maintained and replaced, and storing parts identifying information intrinsic to the individual constituent modules; and a tag reader mounted on the medium conveyor and reading the parts identifying information stored in the radio tags; and wherein the controller has a parts replacement determining unit which, for every rise of the apparatus, moves the medium conveyor to a position permitting read of the radio tags arranged for the individual constituent modules to read the parts identifying information by means of the tag reader and store the information in anon-volatile memory and when the read information is different from the parts identifying information read in the preceding run stored in the non-volatile memory, determines that the part has been replaced; and a parts management unit which manages the parts service life by obtaining statistical information such as the number of operating runs for each of the constituent modules, and when the parts replacement determining unit determines that the part has been replaced, starts a new run of management of the parts life by clearing the statistical information such as the number of operating runs; and wherein a constituent module to be maintained and replaced includes the medium conveyor and the recording/regenerating unit.

In the library apparatus according to the present invention, the radio tag stores at least the version number of parts and the serial number thereof, and the parts replacement determining unit determines, when the serial number read by the radio tag reader is different from the serial number read in the preceding run, that the part has been replaced.

The parts management unit displays an alarm on an apparatus operating panel and reports the alarm to a host when the statistical information of the number of operating runs obtained for each constituent module approaches a prescribed number of operating runs representing the life. The parts management unit counts the number of starting runs as a number of operating runs of the medium conveyor, and counts the number of charging runs or the number of discharging runs of the storage medium as a number of operating runs of the recording/regenerating unit.

In the library apparatus according to the present invention, the parts management unit causes the replaced recording/regenerating unit to execute an alignment measuring processing for charging or discharging the medium by positioning the medium conveyor when the parts replacement determining unit determines that the recording/regenerating unit has been replaced.

The parts management unit changes the setting of the port name of the data transfer port of the replaced recording/regenerating unit to be connected to the host into the port name which has been set for the recording/regenerating unit before replacement, when the parts replacement determining unit determines that the recording/regenerating unit has been replaced.

In the library apparatus according to the present invention, the medium depot and the recording/regenerating unit can be increased in number in units of modules; wherein the radio tags storing module information are arranged for each of the modules; and wherein constituent information generating unit which moves, upon the rise of the apparatus, the medium conveyor to a position permitting read of the radio tags arranged for the individual modules to read the parts identifying information stored therein, and generates constituent information including the arrangement of storing cells of the medium depot and the mounting position of the recording/regenerating unit is provided in the controller.

(Control Method)

The present invention provides a control method of a library apparatus comprising, as constituent modules, a medium depot keeping storage media in units of cells in a plurality of keeping cells; a plurality of recording/Reproducing devices units which record and regenerate information by the use of the storage media; medium conveyors which convey storage media between the medium depot and the recording/regenerating units; and a controller which enters the storage medium taken out from the medium depot into the recording/regenerating unit under the control of the medium conveyor based on a command from a host to cause the recording/regenerating unit to record or regenerate the same; and further comprising radio tags arranged for the individual constituent modules maintained and replaced, and storing parts identifying information intrinsic to the individual constituent modules; and a tag reader mounted on the medium conveyor and reading the parts identifying information stored in the radio tags;

the control method comprises:

a parts replacement determining step of moving, for every rise of the apparatus, the medium conveyor to a position permitting read of the radio tags arranged for the individual constituent modules to read the parts identifying information by means of the tag reader and store the information in a non-volatile memory, and when the read information is different from the parts identifying information read in the preceding run stored in the non-volatile memory, determining that the part has been replaced; and a parts managing step of managing the parts service life by obtaining statistical information such as the number of operating runs for each of the constituent modules, and when the parts replacement determining unit determines that the part has been replaced, starting a new run of management of the parts life by clearing the statistical information such as the number of operating runs.

(Program)

The present invention provides a program which causes a computer serving as a controller for a library apparatus comprising, as constituent modules, a medium depot keeping storage media in units of cells in a plurality of keeping cells; a plurality of recording/regenerating units which record and regenerate information by the use of the storage media; medium conveyor which convey storage media between the medium depot and the recording/regenerating units; and a controller which enters the storage medium taken out from the medium depot into the recording/regenerating unit under the control of the medium conveyor based on a command from a host to cause the recording/regenerating unit to record or regenerate the same, to execute:

a parts replacement determining step of moving, for every rise of the apparatus, the medium conveyor to a position permitting read of the radio tags arranged for the individual constituent modules to read the parts identifying information by means of the tag reader and store the information in a non-volatile memory, and when the read information is different from the parts identifying information read in the preceding run stored in the non-volatile memory, determining that the part has been replaced; and a parts managing step of managing the parts service life by obtaining statistical information such as the number of operating runs for each of the constituent modules, and when the parts replacement determining unit determines that the part has been replaced, starting a new run of management of the parts life by clearing the statistical information such as the number of operating runs The details of the control method and the program of the library apparatus according to the present invention are the same as those in the case of the library apparatus.

According to the present invention, a radio tag storing the parts version number, the serial number and the like is provided for each constituent module of the library apparatus, and upon the rise of the apparatus by turning the power on, the version number, the serial number and the like are read from the radio tag of each constituent module by a tag reader mounted on the conveying robot and are stored in a non-volatile memory. The state of the constituent modules can be easily confirmed by displaying the read tag information on an operating panel or the like of the apparatus.

Upon the rise by the next turn-on of power, when the serial number read out from the radio tag of the constituent module is different from the serial number stored in the non-volatile memory, it is determined that the constituent module has been replaced. The past number of operating runs is cleared, and a new run of life management is started for the replaced module.

As a result, when replacing a constituent module because of a failure or the lapse of the life of the mechanical unit or the driving unit, the number of runs of the constituent module before replacement can be automatically cleared without the need for the maintenance operator to perform the same, thus permitting reliable management of the parts life after replacement, without the risk of omitting clearance of the number of runs upon parts replacement.

When the end of the parts life approaches, an alarm is displayed on the apparatus panel or on the host to notify the fact to the maintenance personnel. Parts replacement is thus accomplished at a proper timing prior to the lapse of the life. This reliably prevents the library apparatus from becoming down by a failure caused by the expiration of the life of the constituent modules, thus improving the reliability.

The above and other objects, features, and advantages of the present invention will become more apparent from the following detailed description with reference to the drawings.

BRIEF DESCRIPTION OF THE DRAWINGS

FIGS. 3A and 3B are block diagrams of the functional configuration of the library apparatus according to the present invention;

FIG. 4 is a descriptive view of the radio tag and the tag reader mounted on the conveying robot used in the present invention;

FIG. 5 is a descriptive view of the tag parts table stored in the radio tag provided in the library apparatus of the present invention;

FIG. 6 is a descriptive view of the constituent information table stored in the non-volatile memory of the controller control board shown in FIG. 4;

FIG. 7 is a descriptive view of the cell table stored in the non-volatile memory of the controller control board shown in FIG. 4;

FIG. 8 is a descriptive view of the parts management table stored in the non-volatile memory of the controller control board shown in FIG. 4.

DESCRIPTION OF THE PREFERRED EMBODIMENTS

Figure 1:
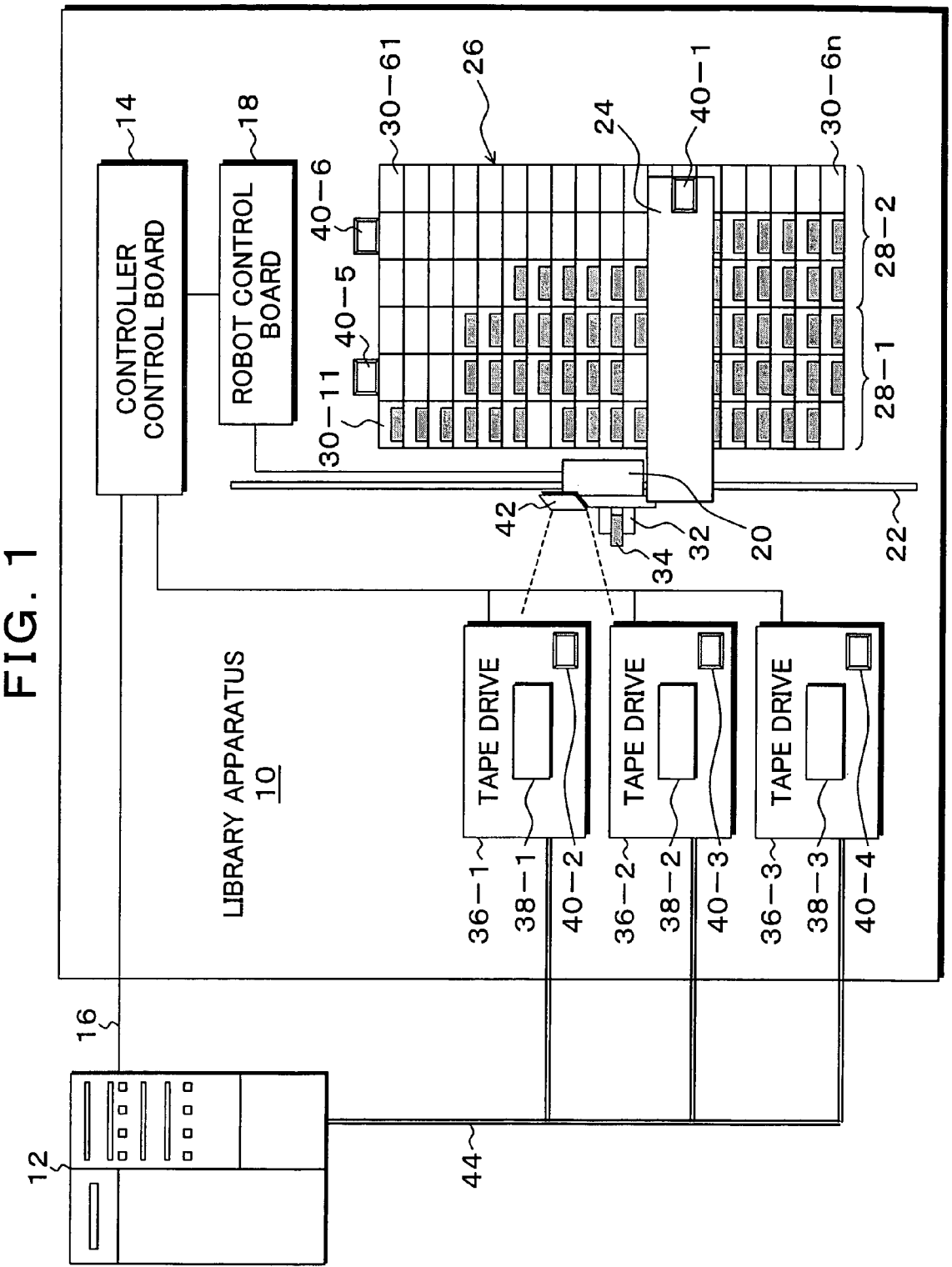
FIG. 1 is a descriptive view of the structure and the hardware configuration of the library apparatus according to the present invention.

FIG. 1 is a descriptive view of the structure and the hardware configuration of the library apparatus according to the present invention. In FIG. 1, the library apparatus 10 of the present invention is connected by a transmission path 16 transmitting a conveying command and a transmission path 44 for read and write of data to the host 12. The library apparatus 10 has as controller control board 14, a robot control board 18, a conveying robot 20 serving as a medium conveyor, a cartridge housing shelf 26, and for example, three tape drives 36-1, 36-2 and 36-3 as recording/regenerating devices. The conveying robot 20 is mounted movably horizontally on a horizontal rail 24, and the horizontal rail 24 is arranged vertically movably on a vertical rail 22, thus making it possible for the conveying robot 20 to move a robot hand to an arbitrary position of the cartridge housing shelf 26 and the tape drives 36-1 to 36-3 in the apparatus, and to charge and discharge a tape cartridge used in this example as a recording medium. In this example, the cartridge housing shelf 26 has two cell modules 28-1 and 28-2, and modules can be added in units of modules. Tape drives 36-1 to 36-3 can also be increased in number up to, for example, eight with each drive as a module.

The cartridge housing shelf 26 is composed of two cell modules 28-1 and 28-2, and (6×n) cells are arranged, ranging from a left top cell 30-11 to a right bottom one 30-6n on the cartridge housing shelf 26 based on a combination of the two cell modules 28-1 and 28-2. In the library apparatus 10 of the present invention comprising these constituent elements, the components such as the conveying robot 20 and the tape drives 36-1 to 36-3 have a service life dependent on the number of operating runs since they have driving units based on motor driving and mechanical units. It is therefore necessary to carry out a parts replacing operation in units of modules, when the end of the service life approaches, by giving an alarm of the fact. For the purpose of ensuring parts life management of the constituent modules including the conveying robot 20 and the tape drives 36-1 to 36-3 in the present invention, radio tags (radio IC tags) 40-1, 40-2, 40-3 and 40-4 are individually provided for the conveying robot 20 and the tape drives 36-1 to 36-3 to be managed, and each of the radio tags 40-1 to 40-4 stores in advance pieces of parts intrinsic information such as the parts version number and the parts serial number. When replacing the tape drive 36-1 because of a failure, for example, a radio tag storing parts intrinsic information corresponding to the tape drive after replacement is prepared for the tape drive attached as a result of replacement, and it is possible to determine the presence or absence of parts replacement by viewing the information of this radio tag. To cope with the provision of the radio tags 40-1 to 40-4 on the constituent elements to be replaced of the library apparatus 10, a tag reader 42 is installed on the conveying robot 20. In the library apparatus 10 of the present invention, the conveying robot 20 is removed to a position permitting read of the ratio tags 40-1 to 40-4, to read the contents of the tags and store the same in the non-volatile memory.

Upon the rise resulting fro the second and subsequent turn-on of power, for example, the serial number representing the position of the contents of the tag read out then is compared with the serial number stored in the non-volatile memory upon the preceding run of read. When the serial numbers are different from each other, it is determined that parts replacement has been conducted, the statistical information acquired for life management, or more specifically, the number of operating runs of the parts is cleared, and life management for the new replaced parts is started. The conveying robot itself is a constituent module of which the life is to be managed, and furthermore, cannot read its own radio tag since the conveying robot itself has a tag reader 42 mounted thereon. A radio tag 40-1 for the conveying robot 20 is therefore arranged at a prescribed position of, for example, the horizontal rail, one of the constituent elements of the medium conveyor including the conveying robot 20. The conveying robot 20 therefore moves to the read position of the radio tag 40-1, reads the parts intrinsic information of itself by means of the tag reader 42 to send it to the controller control board 14, and thus causes the controller control board 14 to determine the presence or absence of replaced parts. In the library apparatus 10 shown in FIG. 1, module intrinsic information is stored by installing a radio tag 40-5 or 40-6 for each of the cell modules 28-1 and 28-2. The cell modules 28-1 and 28-2 are not covered by life management because they do not have a driving unit or a mechanical unit. However, since it is possible to increase the number in units of modules, radio tags 40-5 and 40-6 are provided for each of the modules as in the cell modules 28-1 and 28-2 so that, upon every rise of the library apparatus by turning the power on, the tag contents are read out by the tag reader by positioning by the robot hand 32 also for the radio tags 40-5 and 40-6 of the cell modules 28-1 and 28-2, to determine the constituent elements of the library apparatus 10 upon the rise from the result of read, to permit automatic configuration processing automatically preparing a constituent information table upon increasing the modules.

Figure 2:
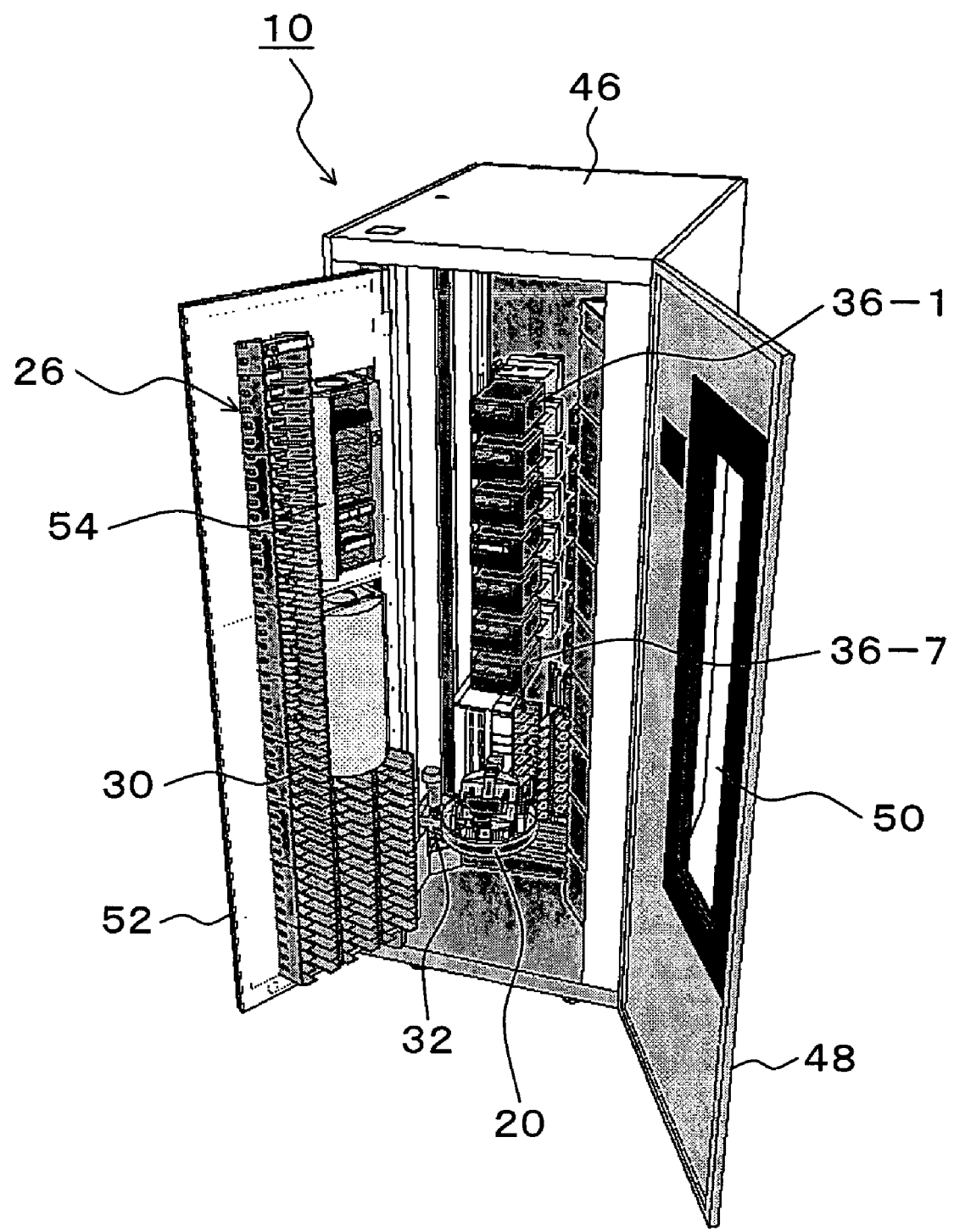
FIG. 2 is a descriptive view illustrating the internal structure of the library apparatus according to the present invention by opening the door.

FIG. 2 is a descriptive view illustrating the internal structure by opening the door of the library apparatus 10 of the present invention. The library apparatus 10 has an enclosure 46 and the outer door 48 on this side of the drawing of the enclosure 446 has an inner door 52 opening to the other side on the inside thereof. The cartridge housing shelf 26 housing cells arranged in five stages vertically is arranged on the inside. A cartridge charging/discharging mechanism 54 is provided in two stages in this example in a part of the cartridge housing shelf 26. A charging/discharging port door 50 is provided at the position of the outer door 48 corresponding to the cartridge charging/Discharging mechanism 54. Seven tape drives 36-1 to 36-7 are installed at positions corresponding to the cartridge housing shelf 26 of the inner door 52 of the enclosure 46. FIG. 2 illustrates a case where four tape drives are added as compared with the case shown in FIG. 1. The conveying robot 20 is arranged at an initial position under the tape drives 36-1 to 36-7. The conveying robot 20 is mounted on a horizontal rail 24, and the horizontal rail 24 is movable vertically along the vertical rail 22. This makes it possible for the conveying robot 20 to position the robot hand at the position of an arbitrary cell 30 on the cartridge housing shelf 26 opening inside the inner door 52, pick up the tape cartridge, and thereafter, turn the robot hand by 180°, position the robot hand at any of the tape drives 36-1 to 36-7, and charge the picked tape cartridge. Upon the completion of processing at the tape drives 36-1 to 36-7, the tape cartridge is injected, and the conveying robot 20 picks up the tape cartridge injected from the tape drive with the robot hand, and returns it to the original cell position having served as the starting point.

Figure 3A:
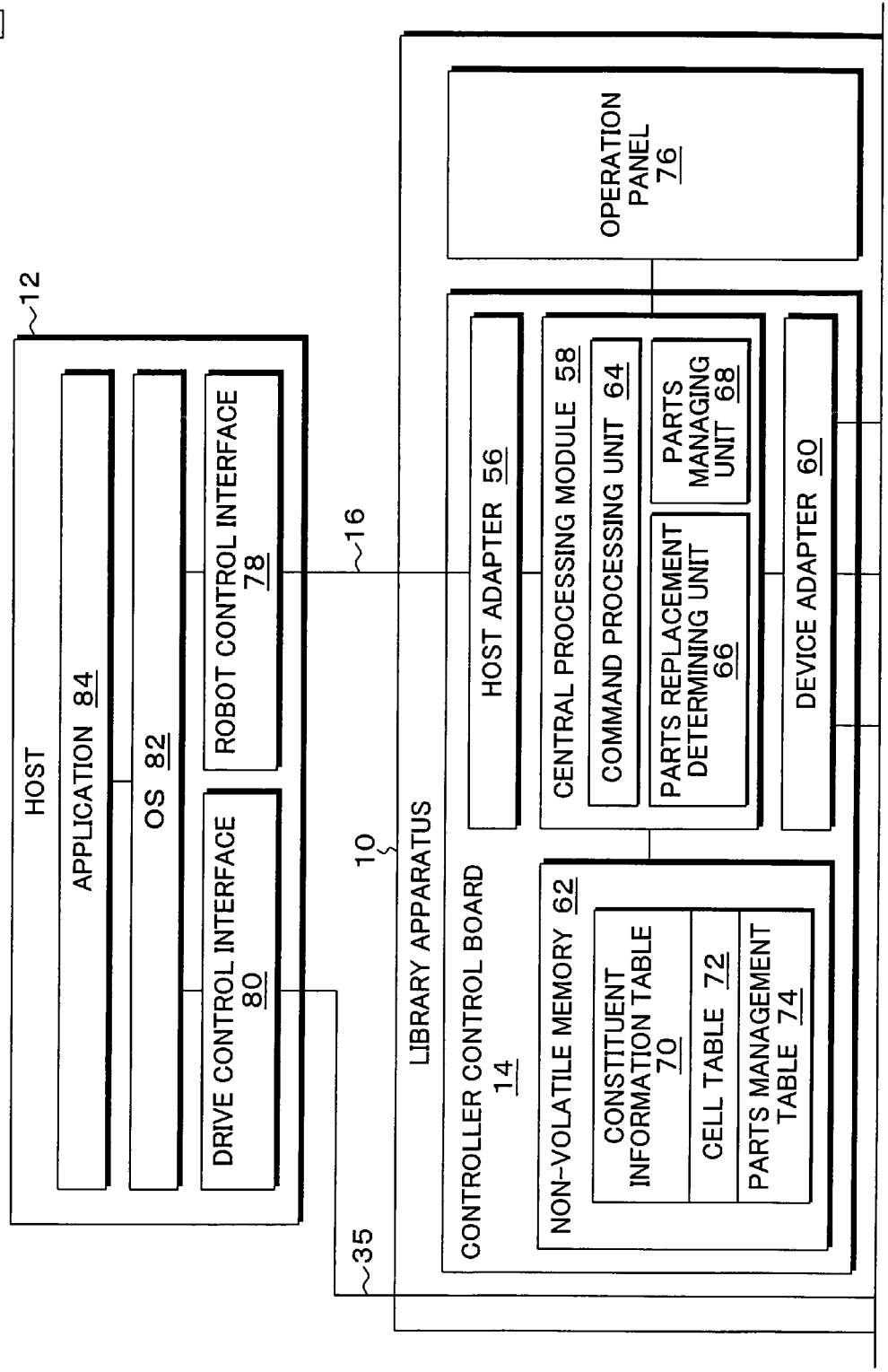

FIG. 3 is a block diagram of the mechanical configuration of the library apparatus according to the present invention. In FIG. 3, a host adapter 56, a central processing module 58, a device adapter 60 and a non-volatile memory 62 are provided on the controller control board 14 provided in the library apparatus 10, and an operating panel 76 provided on the outer door 48 side in FIG. 2 are connected. A command processor 64, a parts replacement determining unit 66, and a parts management unit 68 are provided in the central processing module 58. The non-volatile memory 62 has a constituent information table 70, a cell table 72, and a parts management table 74 provided therein. A robot control interface 78 connecting a transmission path 16, a drive control interface 80 connecting a transmission path 35, an OS 82, and an application 84 are provided on the host 12 side.

The parts replacement determining unit 66 provided in the central processing module 58 moves the conveying robot 20, upon every rise of the library apparatus 10 by power-on, to a position permitting read of the radio tags 40-1 to 40-4 arranged on the horizontal rail 24 and the tape drives 36-1 to 36-3, reads out the parts identifying information by means off the tag reader 42 mounted on the conveying robot 20, and stores the same in the parts management table 74 of the non-volatile memory 62. The parts identifying information read in the preceding run stored in the non-volatile memory 62 is Compared to the parts identifying information just read out, and when these pieces of information are similar, it is determined that the part has been replaced. The parts management unit 68 conducts parts life management by obtaining statistical information such as the number of operating runs for the conveying robot 20 and the tape drives 36-1 to 36-3 individually, which are modules of which the life is managed. When a prescribed percentage, for example 90%, of the predetermined number of operating runs representing the life is reached, the parts management unit 68 determines that the end of the life is approaching, displays an alarm on the operating panel 76, and reports the alarm to the host 12. When it is determined that the parts has been replaced by the parts replacement determining unit 66, the parts management unit 68 clears the statistical information such as the number of operating runs obtained for the module for which the parts replacement is determined, and starts a new run of parts life management for the module for which the part has already been replaced. The command processing unit 64 moves the conveying robot 20 to the cell position on the cartridge housing shelf 26 designated as the destination, i.e., the cell address, on the basis of the move command issued by the host 12 to specify a transmission path 16, depending upon the status of management after the rise of the library apparatus 10, picks up a tape cartridge by means of the robot hand 32, moves the same to the tap drive 36-1, for example, as the destination, and changes the tape cartridge thus taken out. When the move command comes to a normal end with charging of the tape cartridge to the tape drive 36-1, the host 12 executes an access to the tape drive 36-1 via the drive control interface 80, i.e., a write operation based on the write command, or a read operation based on the read command.

Upon normal end of access by the host 12 to the tape drive 36-1, the tape drive 36-1 ejects the tape cartridge. A move command for returning the cartridge after processing to the original cell position is issued from the host 12 to the central processing module 58. The conveying robot 20 moves to the tape drive 36-1, picks up the ejected tape cartridge by means of the robot hand 32, moves the same to the cell taking position of the cartridge housing shelf 26 and returns there the cartridge.

FIG. 4 is a block diagram of the functional configuration of the radio tag and the tag reader mounted on the conveying robot used in the present invention. In FIG. 4, the tag reader 42 is composed of a radio tag communication unit 96, a read processing unit 98, and an antenna 100, and is mounted on the conveying robot 20. The radio tag 40 comprises an antenna 92, a transmitting/receiving unit 86, a controller 88, a memory 90 and a power source unit 94.

When the radio tag 40 enters a communicable area of the antenna 100 provided on the radio tag communication unit 96 along with a move of the tag reader 42 by the conveying robot 20, the radio tag 40 is electromagnetically induced by electromagnetic waves received through the antenna 92. The power source unit 94 thus supplies the power to all the related components and the radio tag becomes active. The radio tag communication unit 96 of the tag reader 42 always transmits a tag reading request. When the transmitting/receiving unit 86 of the radio tag 40 receives the tag reading request, the controller 88 reads out the parts table 95 which contains parts identifying information for the maintenance parts stored in the memory 90 and transmits the same in response. Such a radio tag 40 comprises, for example, a small semiconductor IC chip having a size smaller than 0.5 mm.

FIG. 5 is a format configuration of the parts table 95 stored in the memory 90 of the radio tag shown in FIG. 4. The tag parts table 95 stores the parts number (module number), the parts version number, the parts serial number and the parts manufacturing date for the component elements on which radio tags are installed, such as the conveying robot and the tape drive.

FIG. 6 is a descriptive view of the constituent information table 70 stored in the non-volatile memory of the controller control board 14 shown in FIG. 4. The constituent information table 70 is prepared in the manufacturing stage of the library apparatus 10, and stores the module number, the module name, the positional information, and the implemented flag as basic information. The execution flag has a "1" for the module numbers 1 to 5 in correspondence to the module configuration in the manufacturing stage. For the module number "6" and the subsequent numbers, representing added modules capable of forming a maximum configuration, the implemented flag is reset to "0" in the manufacturing stage. The constituent information table 70 stores basic information, and in addition, set intrinsic information and measured alignment values for the module numbers 1 to 3 corresponding to the tape drives 36-1 to 36-3. The set intrinsic information is a drive control interface based on the transmission path 35 connecting the tape drives 36-1 to 36-3 to the host 12, and stores the port addresses A1, A2 and A3 set on the tape drive side. These port addresses A1 to A3 must always be used as they are for the tape drives even after replacement of the tape drives 36-1 to 36-3. In the present invention, when it is determined that the tape drives 36-1 to 36-3 have been replaced, the port addresses are read out and automatically set as the set intrinsic information of the constituent information table 70 for the tape drives 36-1 to 36-3 after replacement. As a result, it is not necessary for the operator to manually change setting for the port addresses of the drive control interface. As measured alignment values set for the module numbers 1 to 3 corresponding to the tape drives 36-1 to 36-3, correction values for positioning the robot hand 32 of the conveying robot 20 to the medium charging/discharging ports 38-1 to 38-3 (see FIG. 1) of the tape drives 36-1 to 36-3 are stored. Regarding the measured alignment values, the steps comprise moving the robot hand, during the adjustment stage prior to management of the library apparatus 10, to the position of the tape drives 36-1 to 36-3, i.e., the position of the charging/discharging port in accordance with three-dimensional coordinates dependent on the positional information of the constituent information table; carrying out, in this state, a reading operation of the flag serving as a positioning mark provided on the side of the tape drives 36-1 to 36-3 by means of the line sensor 45 using a one-dimensional CCD provided in the conveying robot 20; determining differences $\Delta Xi$ and $\Delta Yi$ between the set position dependent on the positional coordinates of the constituent information table and the actual set position detected in flag reading by the line sensor; and storing these values as measured alignment values. In management of the library apparatus, the positional information for moving the conveying robot 20 to the tape drives 36-1 to 36-3 is positionally corrected by means of the corrected measured alignment values to move the robot hand 32, thereby avoiding a failure in charging and taking out the medium by the robot hand. In the present invention, when it is determined that the parts have been replaced for the tape drives 36-1 to 36-3, the measuring processing of alignment is automatically executed for the tape drives after replacement to rewrite the measured alignment values (corrected) of the constituent information table 70. Furthermore, for the added module numbers 8 to 14 of the constituent information table 70, the mounting positions in the library apparatus 10 have been determined in advance, and the module name and the positional information have been stored in the manufacturing stage. Upon the rise of the library apparatus 10, the radio tags are read out by the tag reader 42 by moving the conveying robot 20 to the mounting position of the added modules, dependent on the positional information also for the added modules. By conducting such read, auto-configuration is executed, in which the constituent information table 70 is reconstructed by determining the presence or absence of the added module implementation.

FIG. 7 is a descriptive view of the cell table 72 stored in the non-volatile memory 62 of the controller control board 14 shown in FIG. 4. Cell addresses 001 to n are set for the individual cells provided on the cartridge housing shelf 26, in the cell table 72, and three-dimensional coordinates serving as positional information are stored for each cell address. Positional coordinates calculated primarily from specification of three-dimensional coordinates upon setting the cell modules 28-1 and 28-2 at specified positions in the library apparatus 10 are stored as the positional information of cell addresses in the cell table, i.e., positional coordinates of the individual cells. The positional information showing reference coordinate positions of the cell modules 28-1 and 28-2 represented by the module numbers 5 and 6 is registered in the constituent information table 70 shown in FIG. 6. Upon determination of this reference coordinate position, positional coordinates for a cell address corresponding to the cell table 72 shown in FIG. 7 are primarily determined on the basis of the design size information. Since, when increasing cell modules in number, the implementation flag of the constituent information table 70 is set as "1" in the read of the radio tag of the added cell modules, the cell addresses of the added cell modules are automatically calculated, and the cell addresses and positional information for the added cell modules are added in the cell table 72.

FIG. 8 is a descriptive view of the parts management table 74 stored in the volatile memory 62 of the controller control board 14 shown in FIG. 4. The parts management table 74 stores the parts intrinsic information including the parts number 1 for the conveying robot 20, and parts numbers 2 to 4 for the tape drives 36-1 to 36-3. The parts intrinsic information includes the parts name (module name), the version number, the serial number and the manufacturing date, and in addition, the number of operating runs and the number of runs representing the life obtained as statistical information for life management of the individual parts. In the library apparatus 10 of the present invention, upon the rise thereof by power-on, the conveying robot 20 is positioned relative to the radio tag 40-1 for the conveying robot 20 and the radio tags for the tape drives 36-1 to 36-3. The tag parts table 96 shown in FIG. 5 is thus read out, and the result is compared to the display of the serial number from among the parts identifying information of the preceding run stored in the maintenance parts management table 74 shown in FIG. 8. In this comparison, when the two serial numbers are different from each other, it is determined that the part has been replaced. The version number, the serial number, and the manufacturing date in the parts management table 74 are updated to the parts identifying information after replacement, and the number of operating runs is cleared. This automatic clearance of the number of operating runs for the parts after replacement causes a new run of life management to be started.

Figure 9A:
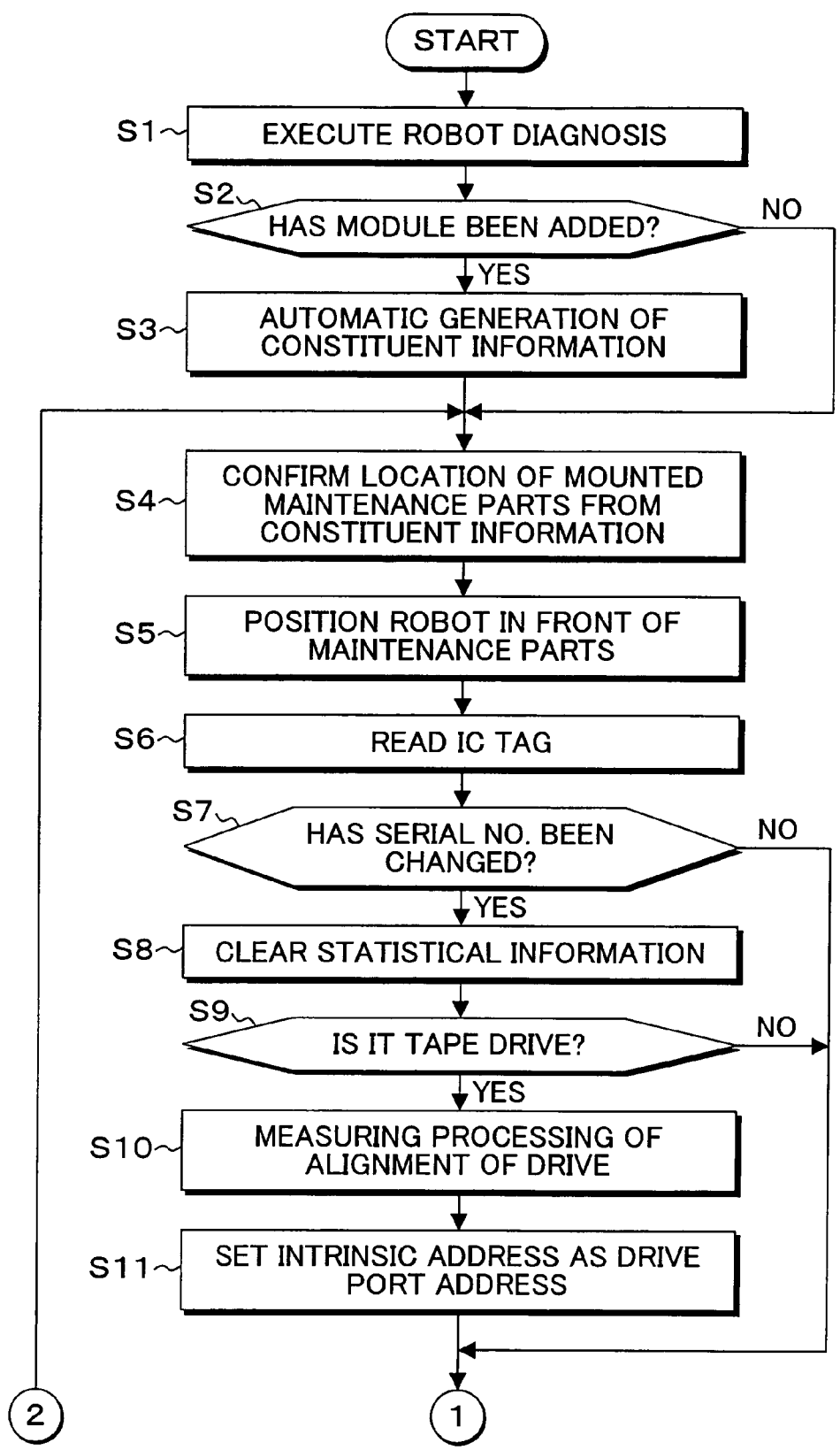
FIGS. 9A and 9B are flowcharts of the processing operations of the library apparatus according to the present invention.
Figure 9B:
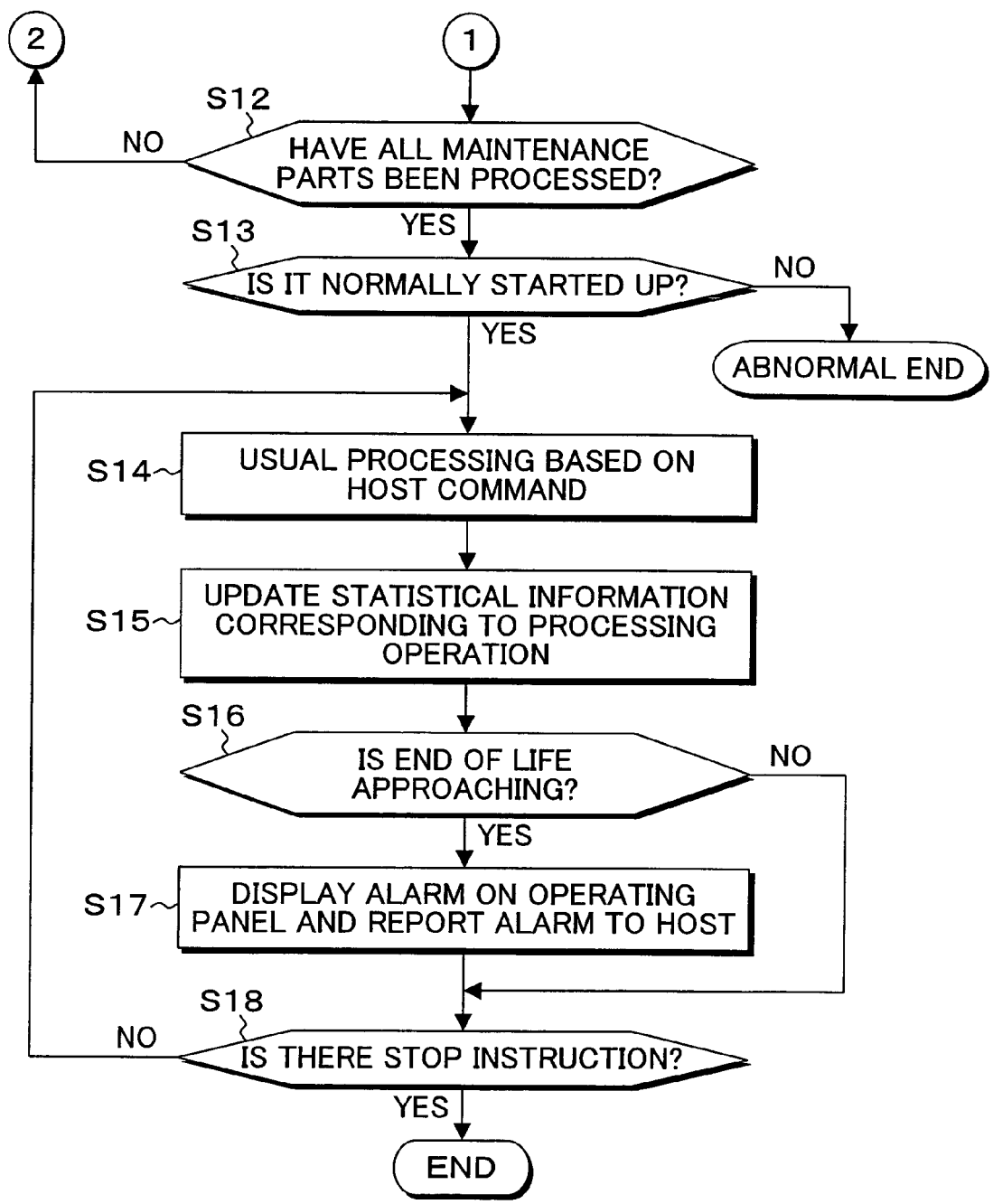

FIGS. 9A and 9B are flowcharts of the processing operations of the library apparatus 10 according to the present invention. In FIG. 9A, upon the rise of the library apparatus through power-on, diagnosing processing of the conveying robot is executed in step S1, and then, in step S2, The presence or absence of added modules is checked. If any modules are added, the process advances to step S3, to carry out automatic generation of constituent information. The presence or absence of added modules in step S2 is checked by obtaining positional information for a module not implemented having an implementation flag of 0 in the constituent information table 70 shown in FIG. 6, moving the conveying robot 20 to read the radio tag by the tag reader 42. If the read information of the radio tag is available, it is determined that addition is present. The automatic generation of the constituent information in step S3 is accomplished by setting the implementation flag of the constituent information table 70 shown in FIG. 6 to 1, and adding necessary module information. If there is no module addition, the automatic generation of the constituent information in step S3 is skipped. Then in step S4, the mounting position of the maintenance parts, i.e., the positional information is obtained from the constituent information table 70 and confirmed. In step S5, the conveying robot 20 is moved to a position before the first maintenance part to position the same there. In step S6, the radio tag is read out by the tag reader 42. Then, in step S7, it is checked if the serial number obtained from the read radio tag contains a change from the serial number of the maintenance parts management table 74 shown in FIG. 8. If the serial number contains no change, steps S8 to S11 are skipped. When a change in the serial number caused by a replacement of the maintenance parts is determined, the number of operating runs in the parts management table 74 shown in FIG. 8, which is statistical information for management is cleared in step S8, and then, in step S9, it is checked whether or nor the replaced maintenance part is a tape drive. If it is a tape drive, an alignment measurement is executed for the tape drive in step S10, and the measured alignment value (corrected value) is rewritten for the module after replacement in the constituent information table 70 shown in FIG. 6. Then in step S11, the port address of the tape drive after replacement is read out from the set intrinsic information of the constituent information table 70, and set the same in the tape drive after replacement.

Then in step S12 shown in FIG. 9B, it is checked whether or not all the maintenance parts are processed. If not as yet processed, the process returns to step S4 to repeat a similar processing for the maintenance parts of the next constituent module. Upon the completion of the processing of steps S4 to S12 for all the maintenance parts, the process advances to step S13 to check whether or not it is a normal startup. If a trouble occurs, it leads to an abnormal end. When startup is normal, the process advances to step S14. In step S14, the ordinary processing is carried out in accordance with a command from the host 12. More specifically, since the host issues a move command for moving the tape cartridge from the cell to the tape drive, conveyance of the tape cartridge based on this move command is performed. When the move command comes to a normal end, the host 12 issues a read command or a write command to the tape drive which has charged the tape cartridge, thus permitting read and write of the cartridge tape. Then, upon the completion of read/write of the cartridge, the tape drive ejects the tape cartridge, and a processing of returning the cartridge from the tape drive to the cell is executed in accordance with a move command issued by the host 12, and this processing is repeated. When, in step S14, the conveying robot 20 or the tape drives 36-1 to 36-3 are activated through a normal processing based on a host command, the statistical information is updated to count up the number of operating runs for every startup for the conveying robot 20 in step S15. For the tape drives 36-1 to 36-3, the number of operating runs is counted up for every charging or discharging of the cartridge to update the statistical information. Then in step S16, it is checked whether or not the current number of operating runs of the maintenance parts management table 74 shown in FIG. 8 approaches the end of the life prescribed, for example, as 90% of the number of runs representing the life. If the number exceeds this threshold value, it is determined that the number is approaching the lapse of life. Then, an alarm is displayed on the operating panel 76 in step S17, and simultaneously, the alarm is reported to the host 12 to urge parts replacement. These steps S14 to S17 are repeated until a stoppage instruction is received in step S18.

The present invention provides a control program of the library apparatus. This program is prepared in accordance with the flowcharts shown in FIGS. 9A and 9B, and executed by the computer implemented on the controller control board 14 as shown in FIG. 3.

The above-mentioned embodiment has covered the case of a tape cartridge serving as a storage medium. The present invention is applicable without any modification to a library apparatus using any other appropriate medium. The present invention includes appropriate variations not impairing the object and advantages, and is not limited by the numerical values shown above.

What is claimed is:

1. A library apparatus comprising, as constituent modules, a medium depot keeping storage media in units of cells in a plurality of keeping cells; a plurality of recording/ regenerating devices which record and regenerate information by the use of said storage media; medium conveyors which convey storage media between said medium depot and said recording/regenerating devices; and a controller which enters the storage medium taken out from said medium depot into said recording/regenerating device under the control by said medium conveyor based on a command from a host to cause said recording/regenerating device to record or regenerate in the storage medium;

wherein the library apparatus has radio tags arranged for the individual constituent modules maintained and replaced, and storing parts identifying information intrinsic to the individual constituent modules; and a tag reader mounted on said medium conveyor and reading the parts identifying information stored in said radio tags; and wherein said controller has a pars replacement determining unit which, for every rise of the apparatus, moves said medium conveyor to a position permitting reading of said radio tags arranged for the individual constituent modules to read the parts identifying information by means of said tag reader and store the information in a non-volatile memory, and when the read information is different from the parts identifying information read in the preceding run stored in said non-volatile memory, determines that the part has been replaced; and a parts management unit which manages the parts service life by obtaining statistical information comprising the number of operating runs for each of said constituent modules, and when said parts replacement determining unit determines that the part has been replaced, starts a new run of management of the parts life by clearing the statistical information comprising said number of operating runs.

2. The library apparatus according to claim 1, wherein a constituent module to be maintained and replaced includes said medium conveyor and recording/regenerating unit.

3. The library apparatus according to claim 1, wherein said radio tag stores at least the edition number of parts and the serial number thereof, and said parts replacement determining unit determines, when the serial number read by said radio tag reader is different from the serial number read in the preceding run, that the part has been replaced.

4. The library apparatus according to claim 1, wherein said parts management unit displays an alarm on an apparatus operating panel and reports the alarm to a host when the statistical information of the number of operating runs obtained for each constituent module approaches a prescribed number of operating runs representing the life.

5. The library apparatus according to claim 1, wherein said parts management unit counts the number of starting runs as a number of operating runs of said medium conveyor, and counts the number of charging runs or the number of discharging runs of said storage medium as a number of operating runs of said recording/regenerating unit.

6. The library apparatus according to claim 1, wherein said parts management unit causes said replaced recording/regenerating unit to execute an alignment measuring processing for charging or discharging the medium by positioning said medium conveyor when said parts replacement determining unit determines that said recording/regenerating unit has been replaced.

7. The library apparatus according to claim 1, wherein said parts management unit changes the setting of the port name of the data transfer port of said replaced recording/regenerating unit to be connected to the host into the port name which has been set for the recording/regenerating unit before replacement, when said parts replacement determining unit determines the necessity to replace said recording/regenerating unit.

8. The library apparatus according to claim 1, wherein said medium depot and said recording/regenerating unit can be increased in number in units of module;

wherein said radio tags storing module information are arranged for each of said modules; and wherein a constituent information generating unit which moves, upon the rise of the apparatus, said medium conveyor to a position permitting read of said radio tags arranged for the individual modules to read the parts identifying information stored therein, and generates constituent information including the arrangement of storing cells of said medium depot and the mounting position of said recording/regenerating unit is provided in said controller.

9. A control method of a library apparatus comprising, as constituent modules, a medium depot keeping storage media in units of cells in a plurality of keeping cells; a plurality of recording/regenerating devices which record and regenerate information by the use of said storage media; medium conveyors which convey storage media between said medium depot and said recording/regenerating devices; and a controller which enters the storage medium taken out from said medium depot into said recording/regenerating device under the control of said medium conveyor based on a command from a host to cause said recording/regenerating device to record or regenerate in the storage medium; and further comprising radio tags arranged for the individual constituent modules maintained and replaced, and storing parts identifying information intrinsic to the individual constituent modules; and a tag reader mounted on said medium conveyor and reading the parts identifying information stored in said radio tags;

said control method comprises:

a parts replacement determining step of moving, for every rise of the apparatus, said medium conveyor to a position permitting read of said radio tags arranged for the individual constituent modules to read the parts identifying information by means of said tag reader and store the information in a non-volatile memory, and when the read information is different from the parts identifying information read in the preceding run stored in said non-volatile memory, determining that the part has been replaced; and a parts managing step of managing the parts service life by obtaining statistical information comprising the number of operating runs for each of said constituent modules, and when said parts replacement determining unit determines that the part has been replaced, starting a new run of management of the parts life by clearing the statistical information comprising said number of operating runs.

10. The control method of a library apparatus according to claim 9, wherein the constituent module to be maintained and replaced includes said medium conveyor and said recording/regenerating unit.

11. The control method of a library apparatus according to claim 9, wherein said radio tag stores at least the edition number of parts and the serial number thereof, and said parts replacement determining step determines, when the serial number read by said radio tag reader is different from the serial number read in the preceding run, that the part has been replaced.

12. The control method of a library apparatus according to claim 9, wherein said parts managing step displays an alarm on an apparatus operating panel and report the alarm to a host when the statistical information of the number of operating runs obtained for each constituent module approaches a prescribed number of operating runs representing the life.

13. The control method of a library apparatus according to claim 9, wherein said parts managing step counts the number of starting runs as a number of operating runs of said medium conveyor, and counts the number of charging runs or the number of discharging runs of said storage medium as a number of operating runs of said recording/regenerating unit.

14. The control method of a library apparatus according to claim 9, wherein said parts managing step causes said replaced recording/regenerating unit to execute an alignment measuring processing for charging or discharging the medium by positioning said medium conveyor when said parts replacement determining unit determines that the recording/regenerating unit.

15. The control method of a library apparatus according to claim 9, wherein said parts managing step changes the setting of the port name of the data transfer port of said replaced recording/regenerating unit to be connected to the host into the port name which has been set for the recording/regenerating unit before replacement, when said parts replacement determining step determines that the recording/regenerating unit has been replaced.

16. The control method of a library apparatus according to claim 9, wherein said medium depot and said recording/regenerating unit can be increased in number in units of modules;

wherein said radio tags storing module information are arranged for each of said modules; and wherein a constituent information generating step which moves, upon the rise of the apparatus, said medium conveyor to a position permitting read of said radio tags arranged for the individual modules to read the parts identifying information stored therein, and generates constituent information including the arrangement of storing cells of said medium depot and the mounting position of said recording/regenerating unit is provided in said controller.

17. A computer-readable storage medium encoded with a computer program which causes a computer serving as a controller for a library apparatus comprising, as constituent modules, a medium depot keeping storage media in units of cells in a plurality of keeping cells; a plurality of recording/regenerating devices which record and regenerate information by the use of said storage media; medium conveyors which convey storage media between said medium depot and said recording/regenerating devices; and a controller which eaters the storage medium taken out from said medium depot into said recording/regenerating device under the control of said medium convey based on a command from a host to cause said recording/regenerating device to record or regenerate in the storage medium; and further comprising radio tags arranged for the individual constituent modules maintained and replaced, and storing parts identifying information intrinsic to the individual constituent modules; and a tag reader mounted on said medium conveyor and reading the parts identifying information stored in said radio tags, to execute:

a parts replacement determining step of moving for every rise of the apparatus, said medium conveyor to a position permitting read of said radio tags arranged for the individual constituent modules to read the parts identifying information by means of said tag reader and store the information in a non-volatile memory, and when the read information is different from the parts identifying information read in the preceding run stored in said non-volatile memory, determining that the part has been replaced; and a parts managing step of managing the parts service life by obtaining statistical information comprising the number of operating runs for each of said constituent modules, and when said parts replacement determining unit determines that the part has been replaced, starting a new run of management of the parts life by clearing the statistical information comprising said number of operating runs.

18. The storage medium according to claim 17, wherein the constituent module to be maintained and replaced includes said medium conveyor and said recording/regenerating unit.

19. The storage medium according to claim 17, wherein said radio tag stores at least the edition number of parts and the serial number thereof, and said parts replacement determining step determines, when the serial number read by said radio tag reader is different from the serial number read in the preceding run, that the part has been replaced.

20. The storage medium according to claim 17, wherein said parts managing step displays an alarm on an apparatus operating panel and reports the alarm to a host when the statistical information of the number of operating runs obtained for each constituent module approaches a prescribed number of operating runs representing the life.

21. The storage medium according to claim 17, wherein said parts managing step counts the number of starting runs as a number of operating runs of said medium conveyor, and counts the number of charging runs or the number of discharging runs of said storage medium as a number of operating runs of said recording/regenerating unit.

22. The program-storage medium according to claim 17, wherein said parts managing step causes said replaced recording/regenerating unit to execute an alignment measuring processing for charging or discharging the medium by positioning said medium conveyor when said parts replacement determining unit determines that said recording/regenerating unit has been replaced.

23. The storage medium according to claim 17, wherein said parts managing step changes the setting of the port name of the data transfer port of said replaced recording/regenerating unit to be connected to the host into the port name which has been set for the recording/regenerating unit before replacement, when said parts replacement determining step determines that the recording/regenerating unit has been replaced.

24. The storage medium according to claim 17, wherein said medium depot and said recording/regenerating unit can be increased in number in units of modules;

wherein said radio tags storing module information are arranged for each of said modules; and wherein a constituent information generating step which moves, upon the rise of the apparatus, said medium conveyor to a position permitting read of said radio tags arranged for the individual modules to read the parts identifying information stored therein, and generates constituent information including the arrangement of storing cells of said medium depot and the mounting position of said recording/regenerating unit is provided in said controller.

\* \* \* \* \*

UNITED STATES PATENT AND TRADEMARK OFFICE
CERTIFICATE OF CORRECTION

| | | |
|---|---|---|
| PATENT NO. | : 7,630,164 B2 | Page 1 of 1 |
| APPLICATION NO. | : 10/999975 | |
| DATED | : December 8, 2009 | |
| INVENTOR(S) | : Shinobu Sasaki | |

It is certified that error appears in the above-identified patent and that said Letters Patent is hereby corrected as shown below:

Title Page, Column 2 under item [56] (Other Publications), Line 1, change "Japenese" to --Japanese--.

Column 12, Lines 14-15, change "recording/ regenerating" to --recording/regenerating--.

Column 12, Line 31, change "pars" to --parts--.

Column 14, Line 65, change "eaters" to --enters--.

Column 14, Line 67, change "convey" to --conveyor--.

Column 16, Line 9, change "The program-storage" to --The storage--.

Signed and Sealed this

Sixteenth Day of March, 2010

David J. Kappos
*Director of the United States Patent and Trademark Office*